April 16, 1929.  R. H. WAGER  1,708,987
SMOKE INSPECTION DEVICE
Filed Aug. 10, 1926  4 Sheets-Sheet 1
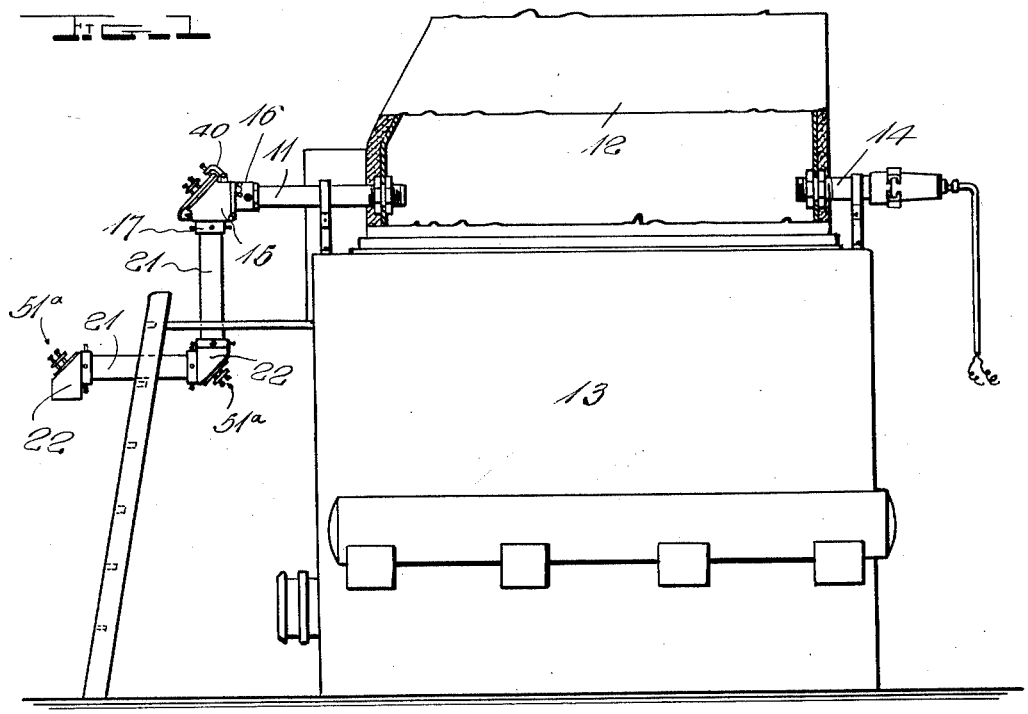
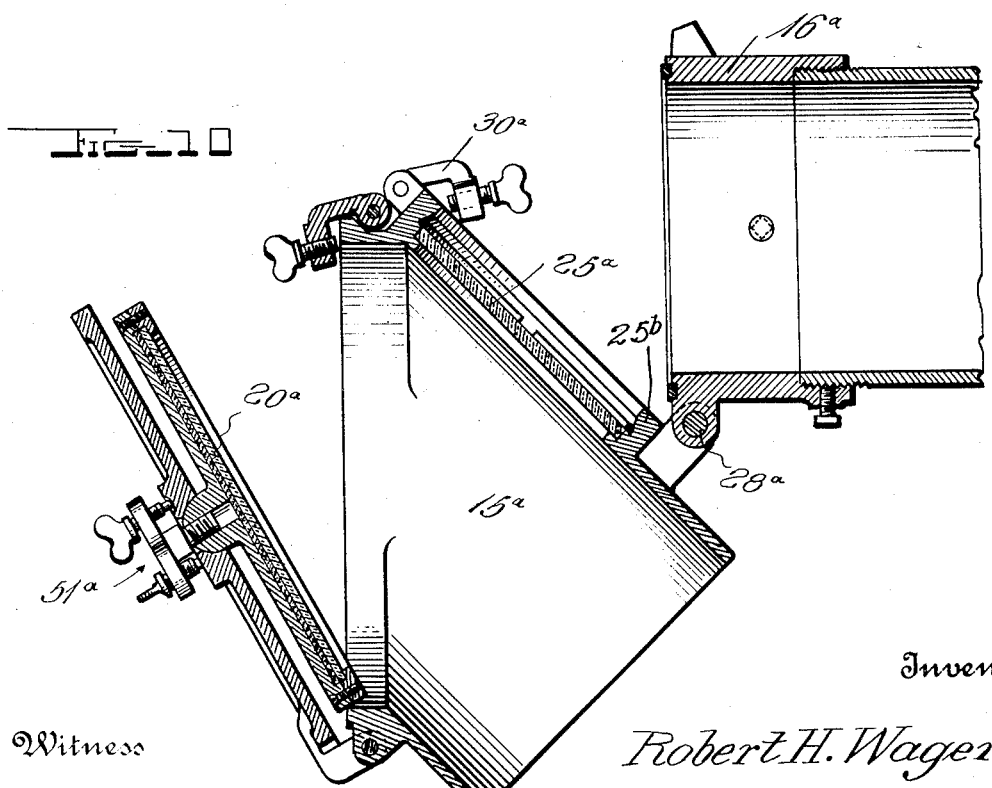
Inventor
Robert H. Wager,
By H. B. Wilson & Co.
Attorneys
Witness April 16, 1929.  R. H. WAGER  1,708,987
SMOKE INSPECTION DEVICE
Filed Aug. 10, 1926  4 Sheets-Sheet 2
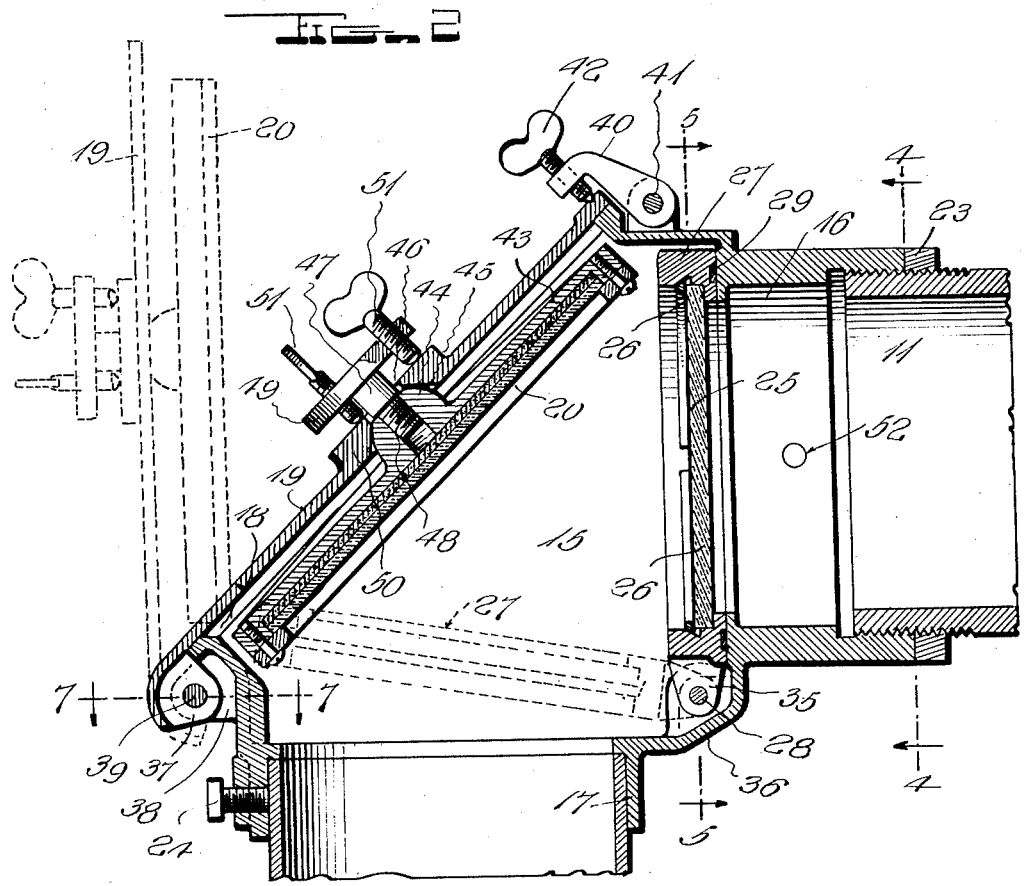
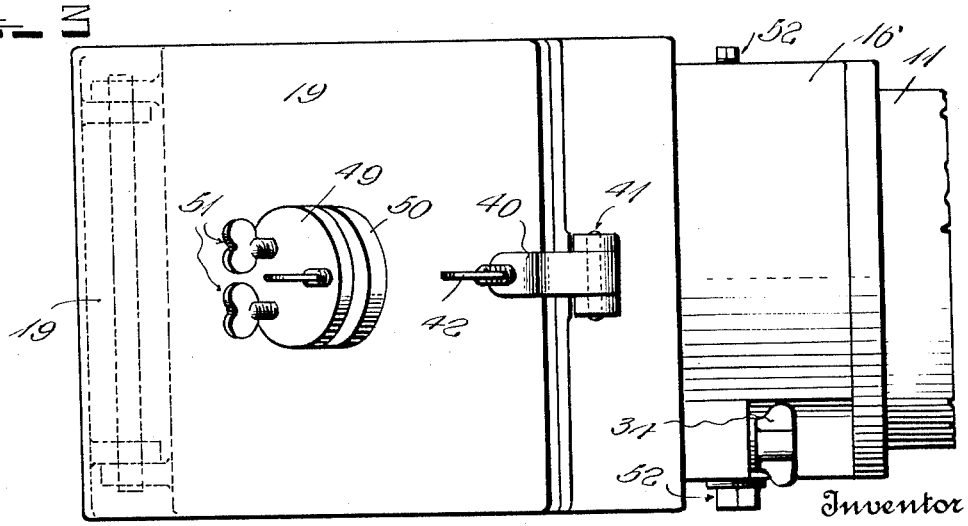
Witness
Inventor
Robert H. Wager,
By H. R. Willson & Co
Attorneys

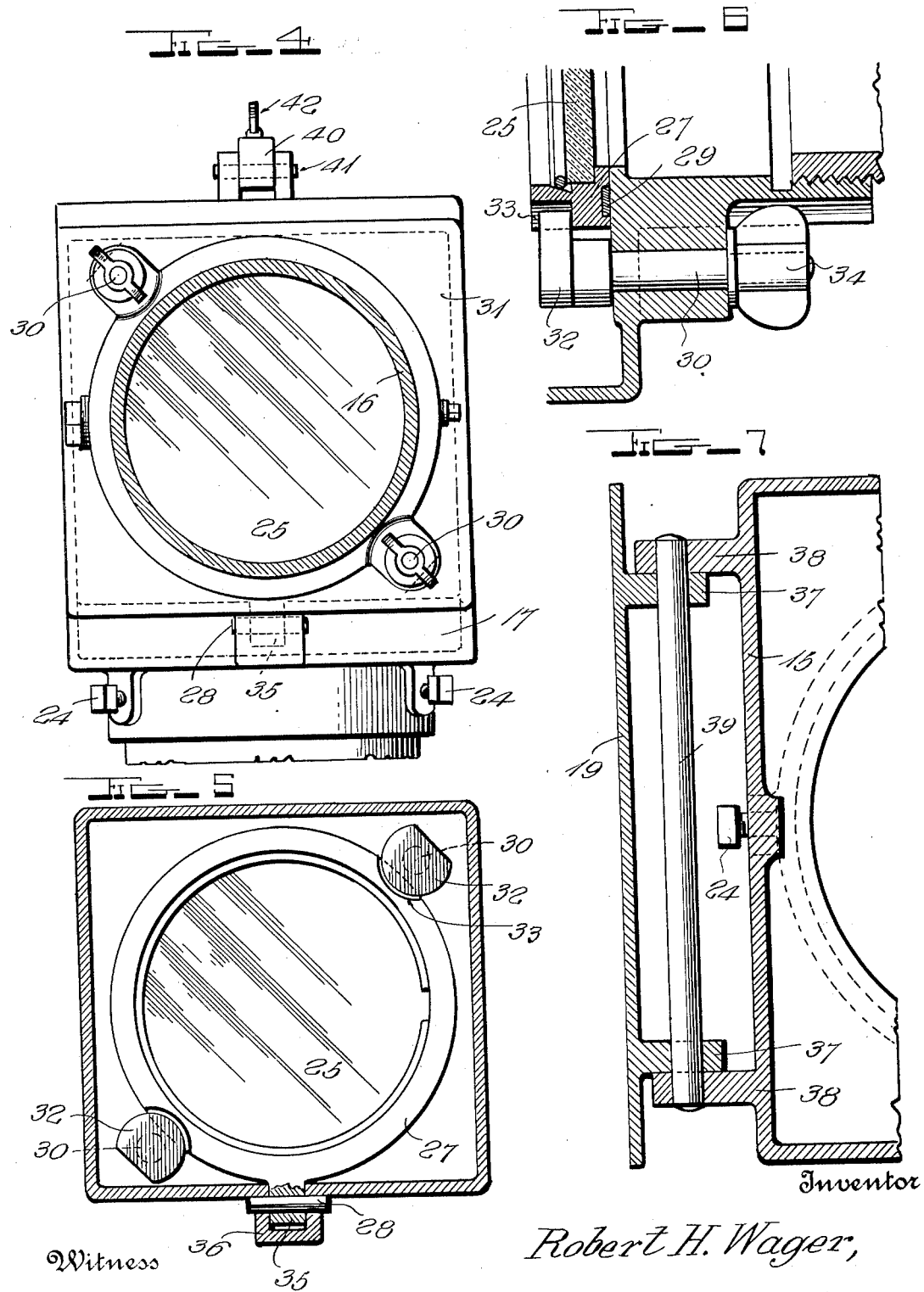

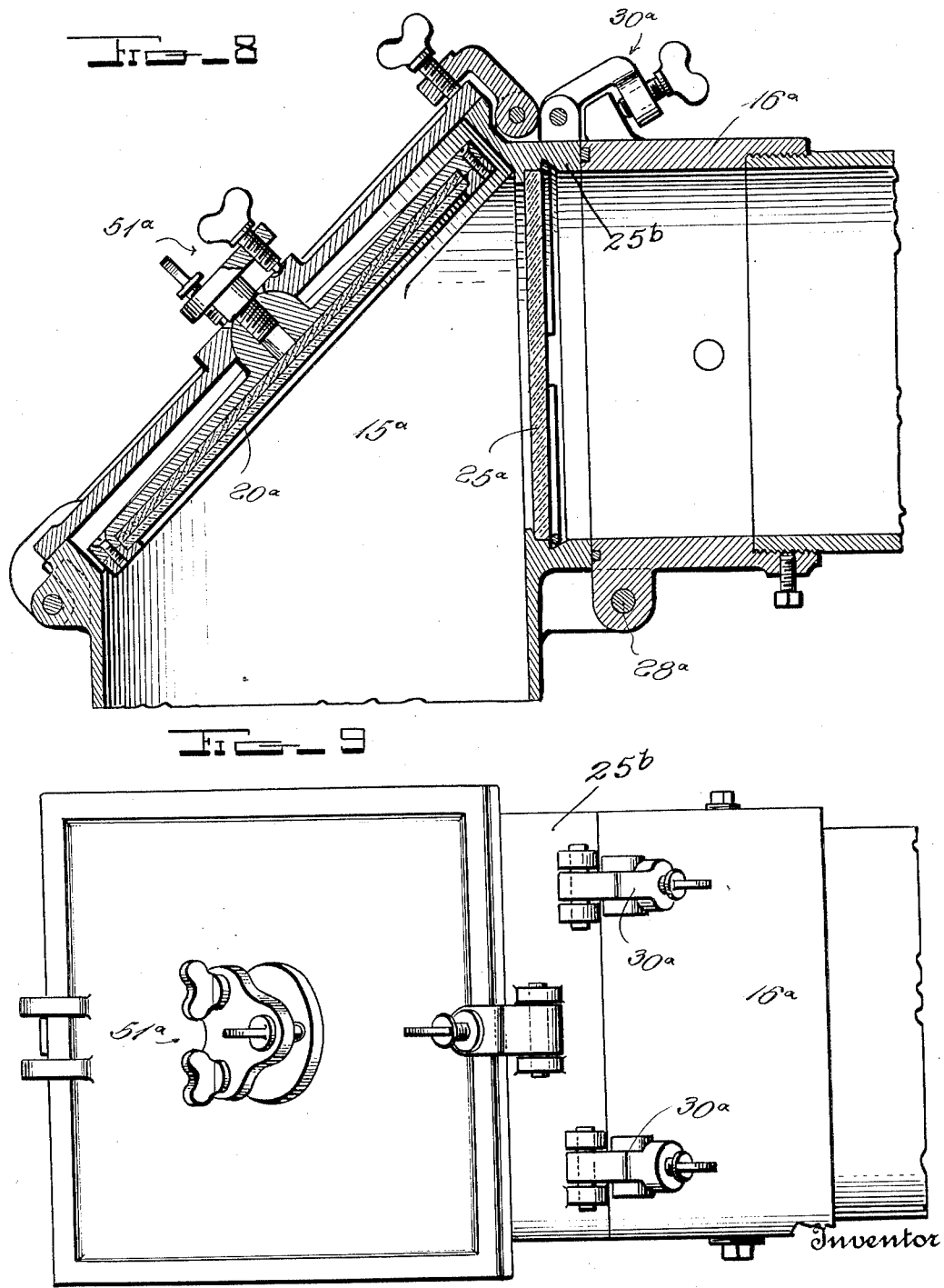

Patented Apr. 16, 1929.

1,708,987

UNITED STATES PATENT OFFICE.

ROBERT HUDSON WAGER, OF JERSEY CITY, NEW JERSEY.

SMOKE-INSPECTION DEVICE.

Application filed August 10, 1926. Serial No. 128,454.

The invention relates to improvements in devices applied to boilers and the like for the purpose of visually inspecting the smoke discharged therefrom, and such invention has reference specifically to inspection devices of the type having a vision tube connected with the smoke uptake or other smoke containing portion of the boiler, said tube being provided at its outer end with an elbow having a mirror and a transparent panel, the latter closing the light inlet of the elbow against entrance of smoke, while the mirror serves to receive light rays from said inlet and reflect them through the light outlet of the elbow. These rays in some instances, are directed to a remote point by an extension tube or tubes and one or more mirrors, but this is not always necessary.

Regardless of the number of mirrors used, accurate adjustment must be made to set each mirror in proper relation with the associated light inlet and outlet, and it is one aim of the invention to provide a new and improved mirror mounting means which will permit both accurate and easy mirror setting.

The transparent panel above referred to requires occasional cleaning, as it is subjected to the smoke within the vision tube, and it is a further aim to provide a novel construction permitting temporary movement of the panel into the elbow and access to the interior of the latter, permitting effective cleaning of said panel.

With the foregoing in view, the invention resides in the novel subject matter hereinafter described and claimed, the description being supplemented by the accompanying drawings.

Fig. 1 is a side elevation showing the invention applied to a boiler.

Fig. 2 is an enlarged vertical sectional view through the outer end of the vision tube, the elbow connected with said tube, and associated parts, the transparent panel being shown in its inwardly swung position in dotted lines, while the outwardly swingable door for the elbow, carrying the mirror, is shown open in dotted lines.

Fig. 3 is a top plan view of the parts shown in Fig. 2.

Fig. 4 is a vertical transverse sectional view on line 4—4 of Fig. 2.

Fig. 5 is a similar view on the correspondingly numbered line of Fig. 2.

Fig. 6 is a detail sectional view showing one of the fasteners for the carrying frame of the transparent panel.

Fig. 7 is a detail section on line 7—7 of Fig. 2.

Fig. 8 is a sectional view showing a different form of construction.

Fig. 9 is a top plan view of the construction shown in Fig. 8.

Fig. 10 is a sectional view similar to Fig. 8 but showing the door of the elbow outwardly swung and illustrating the latter swung outwardly with its transparent panel, permitting cleaning of the latter.

In the form of construction shown in Figs. 1 to 7, 11 designates a vision tube mounted at one side of the smoke uptake 12 of a boiler 13, said tube being, in the present disclosure, in alinement with another tube 14 at the opposite side of the uptake 12 and containing an illuminating bulb (not shown). At the outer end of the tube 11, a casing is shown in the form of an elbow 15, said casing being provided with a light ray inlet 16 suitably coupled to said tube 11, and with a light ray outlet 17 of any desired contour. The outer peripheral portion of the elbow 15 is preferably straight and is formed with a door opening 18 normally closed by a door 19. This door carries a mirror 20 which is adapted to receive light rays from the tube 11 and reflect them through the light outlet 17. These reflected rays may be received by the eye directly at the outlet 17 or below the latter, or extension tubing 21 and mirror-containing elbows 22 may be connected with said outlet 17 for directing the rays of light from the mirror 20 to a remote point. Obviously, the detail shape and construction of the outlet 17 will vary as occasion may demand and the same may be said of the inlet 16. In the present showing, this inlet is threaded internally to receive the outer end of the tube 11, and any desired means such as a lock-nut 23 may be provided to lock the elbow and tube against relative turning when once properly set. The outlet 17 is shown in the form of an internally smooth flange into which a tube such as 21 may be slipped and held by set screws or other desired means 24.

A transparent smoke barrier or panel 25, preferably formed of glass, is mounted to normally swing against and close the inlet 16 against entrance of smoke from the vision tube 11, said inlet being preferably in the form of a collar as shown, to receive the adjacent end of said tube. In the present showing this panel 25 is held by a spring ring 26 in a suitable frame 27, the latter being located within the elbow 15 and being hinged to the latter at its lower side as at 28. The frame 27 is provided with an appropriate packing 29 which engages the portion of the elbow around the inlet 16, and to hold said packing tightly in contact with this portion of the elbow, I prefer to make use of the fastening means shown most clearly in Figs. 4, 5 and 6. Two bolts 30 are shown passing through the inner end portion of the elbow 15, which portion projects laterally at 31 beyond the inlet 16, the latter being in the form of an annular flange. The inner ends of these bolts are provided with heads 32 which are normally received in recesses 33 in the peripheral portion of the frame 27, as shown in Figs. 5 and 6. Appropriate nuts such as the thumb nuts 34 are threaded onto the outer ends of the bolts 30 and normally draw said bolts and their heads rearwardly to similarly move the frame 27, holding the packing 29 in tight contact with the elbow 15. When the nuts are loosened however, the bolts may be rotated so that the heads 32 which are of eccentric nature, will clear the recesses 33. Then, the frame 27 and the panel 25 may be inwardly swung to the dotted line position of Fig. 2. When this is done, the door 19 and the mirror 20 are of course, outwardly swung to or beyond the dotted line position of the figure referred to. Thus, by reaching into the elbow 15 through the opening 18, the panel 25 may be cleaned of all matter which has accumulated thereon while said panel has been subjected to the smoke within the vision tube 11.

In hingedly mounting the frame 27, I preferably provide the latter with a radially projecting lug 35 which is received in a depression 36 in the lower portion of the elbow 15, the pivot pin or the like 28 being passed through said lug and the sides of the depression.

The door 19 is hingedly mounted upon the elbow 15 and when closed, forms the outer peripheral wall of said elbow. In establishing the hinged connection, the elbow and door are preferably provided with adjacent lugs 37 and 38, and a hinge pin 39 is passed through them, said lugs and pin being preferably at the lower end of the door, as clearly shown in Fig. 2.

Any desired means may be employed for normally holding the door 19 in closed position. For this purpose, I preferably make use of an angular arm 40 pivoted at 41 to the outer side of the elbow and provided with a set screw 42, the latter normally engaging the door 19 as shown in Fig. 2. When this set screw is loosened, the arm 40 may be swung aside, permitting the door 19 and the mirror to be outwardly swung. This gives access to the surface of the mirror for cleaning or shining the same and also permits cleaning of the panel 25, when the frame 27 is swung into the elbow 15.

In mounting the mirror 20, I preferably make use of the details of construction shown most clearly in Figs. 2 and 3. This mirror is provided with an appropriate carrying frame 43 having a convex boss 44 at its outer side, preferably disposed at the central portion thereof. This boss is received in a flared or concave inner end 45 of an opening 46 which is formed in the door 19, and a suitable stem 47 passes loosely through this opening and is rigidly secured to the boss 45, preferably by being threaded into the latter as disclosed at 48. The outer end of the stem 47 is provided with an enlarged head 49 which is outwardly spaced from the central portion of the door 19, the latter preferably having a boss 50 around the opening 46. Set screws 51 are threaded through the head 49 at points spaced about the stem 47, the inner ends of said set screws contacting with boss 50. By properly adjusting these screws 51, it will be seen that the frame 43 and the mirror 20 may be tilted to any proper position, so as to accurately set it with regard to the light inlet 16 and the outlet 17, so as to cause the rays of light to be projected from the mirror in the proper manner. In addition to serving as adjusting means for the mirror, the set screws 51, when all tightened, cause binding of the boss 44 against the door 19, effectively locking said mirror in the position at which it has been set.

The numbers 52 merely designate plugged openings in the inlet or flange 16, said plugged openings forming no part of the present invention and being intended for the introduction into the vision tube 11, of instruments for thermally and analytically inspecting the smoke. This subject matter is shown, described and claimed in my pending U. S. application, Ser. No. 126,579, filed August 2, 1926.

In the form of construction shown in Figs. 8, 9 and 10, the body portion of the elbow 15$^a$ is hinged at 28$^a$ to a light-inlet collar 16$^a$ suitably secured to the vision tube 11$^a$, the latter corresponding to the tube 11. Suitable fasteners 30$^a$ are provided to normally hold the body portion of the elbow 15$^a$ in tight co-operative contact with the collar 16$^a$ and when said fasteners are released, said major portion of the elbow may be downwardly swung to the position of Fig. 10, giving access to the transparent panel 25ª, for the purpose of cleaning the latter. Panel 25ª is suitably mounted in a frame 25ᵇ forming part of the elbow body 15ª, said frame normally abutting the collar 16ª.

With the exception of the features to which attention has been specifically directed, the construction shown in Figs. 8, 9 and 10, is substantially a duplicate of that previously described and further detailed explanation will not therefore be given. The mirror however is designated at 20ª and its mounting and adjusting means at 51ª. At this point, it may be stated that this same mirror mounting and adjusting means is preferably employed in each of the elbows 22 and the latter may or may not be provided with outwardly swingable doors or the like carrying said mounting means.

On account of existing advantages for the details of construction herein disclosed, such details are preferably followed. However, within the scope of the invention as claimed, various changes may be made.

I claim:—

1. In a smoke inspection device, a casing having a light inlet passage and a light outlet passage disposed at an angle to each other, said casing also having a door for giving access to its interior, a mirror in the casing for receiving light rays from the inlet and reflecting them through the outlet, said mirror being carried by said door and being accessible for cleaning when the door is opened, a transparent panel closing said light inlet against entrance of smoke, and releasable means normally holding said panel in operative position but permitting movement thereof into the casing to give access to said panel for cleaning when said door is opened.

2. In a smoke inspection device, a casing in the form of an elbow, said casing having a light inlet at one end, a light outlet at its other end and a door opening between its ends, a transparent panel normally closing said light inlet against entrance of smoke, means hingedly mounting said panel for inward swinging into the casing to a position at which its outer side is accessible through said door opening for cleaning, releasable means for normally holding said panel in operative position, and a hinged door normally closing said door opening, said door being provided with a mirror for receiving light rays from said inlet and reflecting them through said outlet, said mirror being accessible for cleaning when the door is opened.

3. In a smoke inspection device having a casing formed with a light inlet and a light outlet, a transparent panel across said inlet to prevent entrance of smoke therethrough, and a mirror at an angle to the axes of the light inlet and the light outlet for receiving light rays from said inlet and reflecting them through said outlet; means mounting said panel for inward movement from its normal position into the casing, and means for giving access to the interior of said casing to permit cleaning of the inwardly moved panel.

4. In a smoke inspection device, a casing in the form of an elbow, said casing having a light inlet at one end, a light outlet at its other end and a door opening between its ends, a mirror at an angle to the axes of the light inlet and the light outlet for receiving light rays from said inlet and reflecting them through said outlet, a transparent panel normally closing said light inlet against entrance of smoke, means hingedly mounting said panel for inward swinging into the casing to a position at which its outer side is accessible through said door opening for cleaning, releasable means for normally holding said panel in operative position, and a hinged door normally closing said door opening.

5. In a smoke inspection device, a casing in the form of an elbow having a light inlet at one end, a light outlet at its other end and an opening in its peripheral portion between said inlet and outlet, said opening being concave at its inner end, a mirror in the casing to receive light rays from the inlet and reflect them through the outlet, said mirror having a convex boss on its back engaging said concave inner end of said opening, a stem projecting rigidly from said boss and passing loosely through said opening, the outer end of said stem having an enlarged head, and set screws threaded through said head at points spaced about said stem, said set screws contacting with the outer side of the casing for adjusting the stem and mirror to accurately set the latter with respect to the light inlet and outlet.

6. A smoke inspection device comprising a vision tube for connection to a smoke passage, a casing having a light inlet and a light outlet at an angle to each other, the former being disposed in communication with said tube, said casing being provided with a mirror-carrying door between the inlet and outlet, a transparent smoke barrier closing said light inlet against entrance of smoke from the vision tube and thus protecting the mirror against the same, and hinge means permitting swinging of the barrier away from the vision tube to allow cleaning of its smoke-facing side, the other side of said barrier and the mirror being accessible for cleaning when the aforesaid door is opened.

7. In a smoke inspection device, an elbow having a light inlet collar at one end for connection with a smoke-containing vision tube, the other end of the elbow being formed with a light outlet, said elbow being provided between its ends with a mirror-carrying door, a frame normally abutting the end of said light inlet collar toward said mirror-carrying door, a transparent barrier carried by said frame to prevent passage of smoke from the vision tube to the mirror, and hinge means permitting swinging of said frame and barrier away from said collar to permit cleaning of the smoke-facing side of said barrier, the other side of the barrier and the mirror being accessible for cleaning when the aforesaid door is opened.

In testimony whereof I have hereunto affixed my signature.

ROBERT HUDSON WAGER.